(12) United States Patent
Kuvshinov et al.

(10) Patent No.: US 10,788,359 B2
(45) Date of Patent: Sep. 29, 2020

(54) CABLE COMPRISING SINUSOIDAL PATHS ALONG LONGITUDINAL SURFACES FOR USE IN DISTRIBUTED SENSING

(71) Applicant: SHELL OIL COMPANY, Houston, TX (US)

(72) Inventors: Boris Nikolaevich Kuvshinov, Rijswijk (NL); Johan Cornelis Hornman, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 224 days.

(21) Appl. No.: 16/014,670

(22) Filed: Jun. 21, 2018

(65) Prior Publication Data

US 2018/0299322 A1 Oct. 18, 2018

Related U.S. Application Data

(62) Division of application No. 14/418,393, filed as application No. PCT/US2013/052647 on Jul. 30, 2013, now Pat. No. 10,088,353.

(60) Provisional application No. 61/678,482, filed on Aug. 1, 2012.

(51) Int. Cl.
*G01H 9/00* (2006.01)
*G02B 6/44* (2006.01)
*G01V 1/00* (2006.01)

(52) U.S. Cl.
CPC ............. *G01H 9/004* (2013.01); *G01V 1/00* (2013.01); *G02B 6/4413* (2013.01)

(58) Field of Classification Search
CPC .. G02B 6/4413; G01H 9/004; G01D 5/35358; G01V 1/00
See application file for complete search history.

(56) References Cited

U.S. PATENT DOCUMENTS

| | | | |
|---|---|---|---|
| 4,141,623 | A | 2/1979 | Dubost et al. |
| 4,524,436 | A | 6/1985 | Hall et al. |
| 4,568,408 | A | 2/1986 | Schmadel et al. |
| 4,634,852 | A | 1/1987 | Shaw |
| 5,504,720 | A | 4/1996 | Meyer et al. |
| 5,696,628 | A | 12/1997 | Sutton et al. |
| 6,004,639 | A | 12/1999 | Quigley et al. |
| 6,211,964 | B1 | 4/2001 | Luscombe et al. |

(Continued)

FOREIGN PATENT DOCUMENTS

| | | |
|---|---|---|
| WO | 2009158630 A1 | 12/2009 |
| WO | 2010010318 A2 | 1/2010 |

(Continued)

OTHER PUBLICATIONS

Alexis Méndez et al., Overview of fiber optic sensors for NDT applications, Oct. 2007, IV NDT Panamerican Conference Buenos Aires, pp. 1-11 (Year: 2007).*

(Continued)

*Primary Examiner* — Mischita L Henson

(57) ABSTRACT

A distributed fiber optic cable including an elongate body and optical fibers longitudinally housed in the elongate body. The optical fibers lie in in sinusoidal paths along longitudinal surfaces of a prism. The distributed fiber optic cable can be used for sensing an acoustic wave by measuring backscattered light from a laser pulse input into the optical fibers in the fiber optic cable.

6 Claims, 2 Drawing Sheets

(56) References Cited

U.S. PATENT DOCUMENTS

| | | |
|---|---|---|
| 6,269,198 B1 | 7/2001 | Hodgson et al. |
| 6,281,489 B1 | 8/2001 | Tubel et al. |
| 6,510,103 B1 | 1/2003 | Knudsen et al. |
| 6,588,266 B2 | 7/2003 | Tubel et al. |
| 6,601,671 B1 | 8/2003 | Zhao et al. |
| 6,840,114 B2 | 1/2005 | Niezgorski et al. |
| 6,853,780 B1 | 2/2005 | Brandi et al. |
| 6,874,361 B1 | 4/2005 | Meltz et al. |
| 7,201,221 B2 | 4/2007 | Tubel et al. |
| 7,224,872 B2 | 5/2007 | Goldner et al. |
| 7,284,903 B2 | 10/2007 | Hartog |
| 7,315,666 B2 | 1/2008 | Van Der Spek |
| 7,369,716 B2 | 5/2008 | Berg et al. |
| 7,668,411 B2 | 2/2010 | Davies et al. |
| 7,740,064 B2 | 6/2010 | McCoy et al. |
| 7,946,341 B2 | 5/2011 | Hartog et al. |
| 7,954,560 B2 | 6/2011 | Mathiszik et al. |
| 8,131,121 B2 | 3/2012 | Huffman |
| 8,505,625 B2 | 8/2013 | Ravi et al. |
| 8,848,485 B2 | 9/2014 | Bostick |
| 8,924,158 B2 | 12/2014 | Kragh et al. |
| 9,080,949 B2 | 7/2015 | Mestayer et al. |
| 9,250,120 B2 | 2/2016 | Smith et al. |
| 9,766,119 B2 | 9/2017 | Den Boer et al. |
| 2004/0043501 A1 | 3/2004 | Means et al. |
| 2005/0115741 A1 | 6/2005 | Terry et al. |
| 2006/0233482 A1 | 10/2006 | Rambow |
| 2009/0132183 A1 | 5/2009 | Hartog et al. |
| 2009/0219171 A1 | 9/2009 | Vigneaux |
| 2010/0107754 A1 | 5/2010 | Hartog et al. |
| 2010/0207019 A1 | 8/2010 | Hartog et al. |
| 2010/0254650 A1 | 10/2010 | Rambow |
| 2010/0315630 A1 | 12/2010 | Ramos et al. |
| 2011/0044574 A1 | 2/2011 | Strong |
| 2011/0069302 A1 | 3/2011 | Hill et al. |
| 2011/0088462 A1 | 4/2011 | Samson et al. |
| 2011/0088910 A1 | 4/2011 | McCann et al. |
| 2011/0149688 A1 | 6/2011 | Hill et al. |
| 2011/0185815 A1 | 8/2011 | McCann |
| 2011/0216996 A1 | 9/2011 | Rogers |
| 2011/0292763 A1 | 12/2011 | Coates et al. |
| 2011/0320147 A1 | 12/2011 | Brady et al. |
| 2012/0017687 A1 | 1/2012 | Davis et al. |
| 2012/0018149 A1 | 1/2012 | Fidan et al. |
| 2012/0020184 A1 | 1/2012 | Wilson et al. |
| 2012/0057432 A1 | 3/2012 | Hill et al. |
| 2012/0111104 A1 | 5/2012 | Taverner et al. |
| 2012/0287749 A1 | 11/2012 | Kutlik et al. |
| 2013/0242698 A1 | 9/2013 | McEwen-King et al. |

FOREIGN PATENT DOCUMENTS

| | | |
|---|---|---|
| WO | 2010034986 A1 | 4/2010 |
| WO | 2010136810 A2 | 12/2010 |
| WO | 2011010110 A2 | 1/2011 |
| WO | 2011039501 A2 | 4/2011 |
| WO | 2011058312 A2 | 5/2011 |
| WO | 2011058313 A2 | 5/2011 |
| WO | 2011058314 A1 | 5/2011 |
| WO | 2011058322 A2 | 5/2011 |
| WO | 2011067554 A1 | 6/2011 |
| WO | 2011076850 A2 | 6/2011 |
| WO | 2011141537 A1 | 11/2011 |
| WO | 2011148128 A1 | 12/2011 |

OTHER PUBLICATIONS

Leno S. Pedrotti, Basic Geometrical Optics, In Fundamentals of Photonics, Module 1. 3, pp. 73-116, https://doi.org/10.1117/3.784938.ch3 (Year: 2008).*

Unknown, Fiber-Optic Sensing Technologies, 2012, Pinnacle A Haliburton Service, Haliburton, pp. 1-12 (Year: 2012).*

Xin Liu et al., Distributed Fiber-Optic Sensors for Vibration Detection, 2016, Sensors, 16, 1164, pp. 1-31 (Year: 2016).*

International Search Report and Written Opinion received for PCT Patent Application No. PCT/US2013/052647, dated Jan. 2, 2014, 6 pages.

International Search Report and Written Opinion received for PCT Patent Application No. PCT/US2012/069464, dated Mar. 28, 2013, 12 pages.

Barrias et al., "A Review of Distributed Optical Fiber Sensors for Civil Engineering Applications", vol. 16, Issue No. 5, Sensors, May 23, 2016, 35 pages.

"Fiber Optic Sensor Technology", Luna Innovations, Products and Services, Jun. 2015, Web link—www.AutomotiveTestingTechnologyInternational.com, 2 pages.

* cited by examiner

CABLE COMPRISING SINUSOIDAL PATHS ALONG LONGITUDINAL SURFACES FOR USE IN DISTRIBUTED SENSING

CROSS-REFERENCE TO RELATED APPLICATIONS

This is a Divisional application of U.S. application Ser. No. 14/418,393, filed Jan. 29, 2015, which is a National Stage (§ 371) application of PCT/US2013/052647, filed Jul. 30, 2013, which claims the benefit of U.S. Provisional Application No. 61/678,482, filed Aug. 1, 2012. This case is also related to U.S. application Ser. No. 61/576,192, filed Dec. 15, 2011, and entitled "Detecting Broadside Acoustic Signals with a Fiber Optical Distributed Acoustic Sensing (Das) Assembly," which is incorporated herein by reference in its entirety.

FIELD OF THE INVENTION

The invention relates to fiber optic devices and in particular to a fiber optical Distributed Acoustic Sensing (DAS) assembly that is adapted to sense the magnitude and direction of acoustic signals, and particularly those signals that are travelling at an angle or substantially perpendicular to the device.

BACKGROUND OF THE INVENTION

Various attempts have been made to provide sensing capabilities in the context of petroleum exploration, production, and monitoring, with varying degrees of success. Recently, these attempts have included the use of fiber optic cables to detect acoustic energy. Because the cables typically comprise optically conducting fiber containing a plurality of backscattering inhomogeneities along the length of the fiber, such systems allow the distributed measurement of optical path length changes along an optical fiber by measuring backscattered light from a laser pulse input into the fiber. Because they allow distributed sensing, such systems may be referred to as "distributed acoustic sensing" or "DAS" systems. One use of DAS systems is in seismic applications, in which seismic sources at known locations transmit acoustic signals into the formation, and/or passive seismic sources emit acoustic energy. The signals are received at seismic sensors after passing through and/or reflecting through the formation. The received signals can be processed to give information about the formation through which they passed. This technology can be used to record a variety of seismic information. Another application is in the field of in-well applications and acoustic fluid monitoring.

DAS systems typically detect backscattering of short (1-10 meter) laser pulses from impurities or inhomogeneities in the optical fiber. If fiber is deformed by an incident seismic wave then 1) the distance between impurities changes and 2) the speed of the laser pulses changes. Both of these effects influence the backscattering process. By observing changes in the backscattered signal it is possible to reconstruct the seismic wave amplitude. The first of the above effects appears only if the fiber is stretched or compressed axially. The second effect is present in case of axial as well as radial fiber deformations. The second effect is, however, several times weaker than the first. Moreover, radial deformations of the fiber are significantly damped by materials surrounding the fiber. As a result, a conventional DAS system with a straight fiber is mainly sensitive to seismic waves polarized along the cable axis, such as compression (P) waves propagating along the cable or shear (S) waves propagating perpendicular to the cable. The strength of the signal varies approximately as $\cos^3 \theta$, where $\theta$ is the angle between the fiber axis and the direction of wave propagation (for P waves). Thus, while there exists a variety of commercially available DAS systems that have varying sensitivity, dynamic range, spatial resolution, linearity, etc., all of these systems are primarily sensitive to axial strain. Acoustic signals travelling normal to the fiber axis may sometimes be referred to as "broadside" signals and, for P waves, result in radial strain on the fiber. Thus, as the angle between direction of travel of the acoustic signal and the fiber axis approaches 90°, DAS cables become much less sensitive to the signal and may even fail to detect it. The Appendix attached hereto provides further discussion of the mathematics of sinusoidal fibers.

Hence, it is desirable to provide an improved cable that is more sensitive to signals travelling normal to its axis and enables distinguishing radial strain from the axial strain. Sensitivity to broadside waves is particularly important for seismic or microseismic applications, with cables on the surface or downhole. In addition to broadside sensitivity, it is also desirable to provide three-component (3C) sensing, from which the direction of travel of the sensed signal can be determined.

SUMMARY OF THE INVENTION

In accordance with preferred embodiments of the invention there is provided a distributed fiber optic cable comprising an elongate body and a first optical fiber longitudinally housed in the body, wherein the fiber describes a sinusoid having an amplitude and a first wavelength along the length of the body and wherein the sinusoid rotates along the length of the body so as to describe a twisted sinusoid having a twist wavelength.

The cable may provide a plurality of sensing channels and the first wavelength may be a function of a desired channel length. The first wavelength may also be a function of the amplitude.

The first wavelength may be between 0.001 and 0.1 m, between 0.005 and 0.1 m, or more preferably between 0.005 and 0.05 m. The twist wavelength may be between 1 m and 50 m, between 2 m and 20 m, or more preferably approximately 10 m.

The fiber optic cable may define a helix.

The amplitude may be a function of the thickness of the body.

The invention further provides a method for sensing an acoustic wave, comprising a) providing a set of signals collected from a distributed fiber optic cable comprising an elongate body and a first optical fiber longitudinally housed in said body, wherein the fiber describes a sinusoid having an amplitude and a first wavelength along the length of the body and wherein the sinusoid rotates along the length of the body so as to describe a twisted sinusoid having a twist wavelength, b) processing the signals so as to divide the fiber in each twist wavelength of cable into a predetermined number of channels, c) measuring the amplitudes in each channel and calculating the maximum and minimum amplitude in a preselected length of cable, and d) using the calculated maximum and minimum for the preselected length of cable to determine the amplitude and direction of the wave at the preselected length of cable.

The preselected length of cable in step c) may be equal to one-half of the twist wavelength. The twist wavelength may be between 1 m and 50 m and the predetermined number of channels may be 10. The twist wavelength is between 2 m and 20 m. More preferably, the twist wavelength is 10 m and the preselected length of cable in step c) is 5 m.

BRIEF DESCRIPTION OF THE DRAWINGS

For a more detailed understanding of the invention, reference is made to the accompanying Figures wherein.

DETAILED DESCRIPTION OF A PREFERRED EMBODIMENT

An initial analysis starts with a configuration in which three sinusoidal fibers lie in the three longitudinal surfaces of a triangular prism as shown below. All three fibers are assumed to have the same shape.

Figure 1:
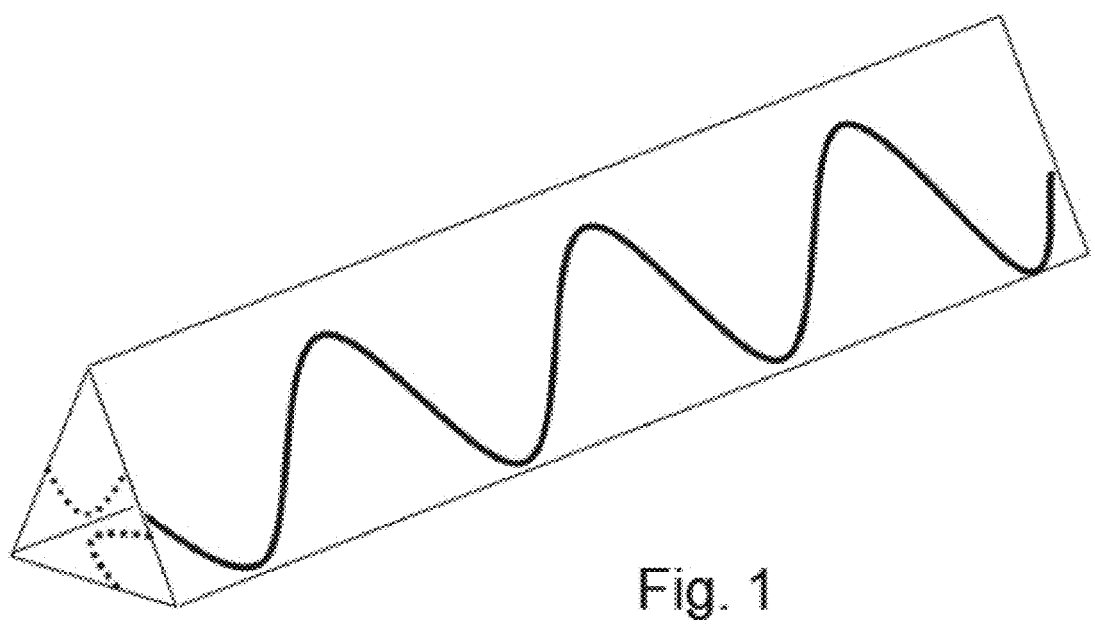
FIG. 1 is a schematic view of a triangular prism having a sinusoidal path along each of its longitudinal surfaces.
Figure 2:
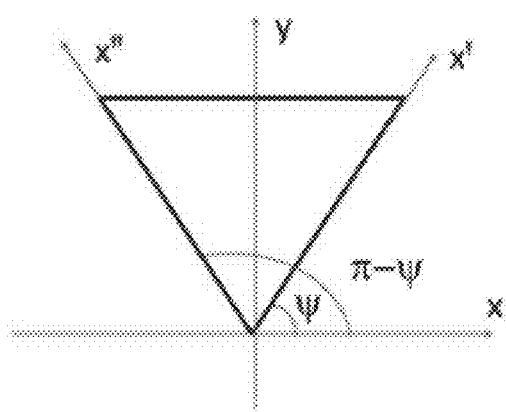
FIG. 2 is a schematic view of a coordinate system.

A coordinate system (x, y, z) is chosen such that the z axis is directed along the prism, and x- and y-axes lie in its cross-section. One of the prism sides lies in the (x, z) plane, as illustrated in FIG. 2. Two other sides lie in the (x', z) and (x", z) planes. The x' and x" axes are rotated with respect the x-axis on angles ψ=60 and ψ-=120° correspondingly.

Generally speaking, the strain tensor $e_{jk}$ has 6 independent components. Using three fibers one can do only 3 independent measurements. These 3 measurements are not sufficient to deduce 6 unknown components of the strain tensor.

Figure 3:
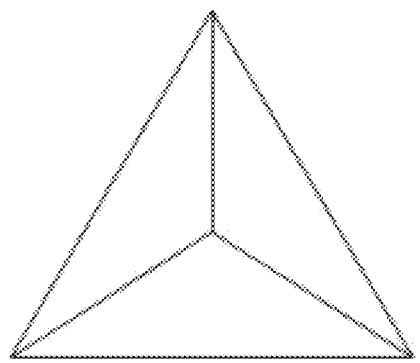
FIG. 3 is an illustration of a possible combination of coordinate systems.

One way to obtain sufficient data may be to combine triangular bodies to form a larger body, as shown in FIG. 3. If the angles are selected to provide sufficient information, all 6 unknown components of the strain tensor may be calculated.

However, the strain tensor can be determined uniquely if with particular types of elastic deformations are assumed. In most geophysical application one measures primary seismic waves. The waves coming from distant targets can be approximately considered as plane waves.

Transformation of the Strain Sensor

Figure 4:
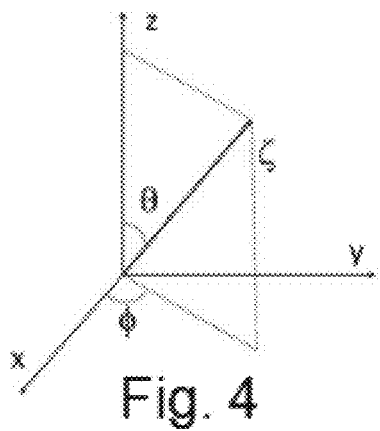
FIG. 4 is a diagram showing orientation of the ζ-axis with respect to the prism coordinate system.

Suppose that a plane primary wave propagates along the ζ-axis. Orientation of the ζ-axis with respect to the prism coordinate system can be specified by two angles, θ and φ, as is shown in FIG. 4. The strain tensor has only one component $e\zeta\zeta$ in the coordinate system (ξ,η,ζ), where ζ and η are arbitrary axes so that the three axes ξ, η and ζ form an orthogonal basis. Components of the strain tensor in two different coordinate systems are related as $$e_{x'x''} = \frac{\partial \chi'}{\partial \xi}\frac{\partial \chi''}{\partial \xi}e_{\xi\xi} + \frac{\partial \chi'}{\partial \eta}\frac{\partial \chi''}{\partial \eta}e_{\eta\eta} + \quad (2)$$
$$\frac{\partial \chi'}{\partial \zeta}\frac{\partial \chi''}{\partial \zeta}e_{\zeta\zeta} + \left(\frac{\partial \chi'}{\partial \xi}\frac{\partial \chi''}{\partial \eta} + \frac{\partial \chi'}{\partial \eta}\frac{\partial \chi''}{\partial \xi}\right)e_{\xi\eta} +$$
$$\left(\frac{\partial \chi'}{\partial \xi}\frac{\partial \chi''}{\partial \zeta} + \frac{\partial \chi'}{\partial \zeta}\frac{\partial \chi''}{\partial \xi}\right)e_{\xi\zeta} + \left(\frac{\partial \chi'}{\partial \eta}\frac{\partial \chi''}{\partial \zeta} + \frac{\partial \chi'}{\partial \zeta}\frac{\partial \chi''}{\partial \eta}\right)e_{\eta\zeta}.$$

From which it follows that $e_{xx} = e_{\zeta\zeta}\sin^2\theta\cos^2\phi,$
$e_{yy} = e_{\zeta\zeta}\sin^2\theta\sin^2\phi,$
$e_{xy} = e_{\zeta\zeta}\sin^2\theta\sin\phi\cos\phi,$
$e_{zz} = e_{\zeta\zeta}\cos^2\theta.$ In what follows that $e_{\zeta\zeta}$ is positive and it refers to the maximum strain in the wave. Equation (2) shows that the strain tensor in plane primary waves is fully determined by three variables: $e_{\zeta\zeta}$, θ, and φ, that can be reconstructed from three independent measurements. Transition between the coordinate systems (x', y', z) and (x, y, z) is given by the equations $$x' = x \cos \psi + y \sin \psi, \quad y' = -x \sin \psi + y \cos \psi. \quad (3)$$

Using Eq. (3) and Eq. (1), gives $$e_{x'x'} = \cos^2 \psi e_{xx} + 2 \sin \psi \cos \psi e_{xy} + \sin^2 \psi e_{yy}. \quad (4)$$

The expression for $e_{x''x''}$ is obtained by making the replacement ψ→π−ψ is Eq. (4), $$e_{x''x''} = \cos^2 \psi e_{xx} - 2 \sin \psi \cos \psi e_{xy} + \sin^2 \psi e_{yy}. \quad (5)$$

Twisted Sinusoid

Another approach is to use a single twisted strip, so that s orientation angle ψ varies with z. The signal measured by this strip is equal to $$S(\psi) = \alpha(\cos^2 \psi e_{xx} + 2 \sin \psi \cos \psi e_{xy} + \sin^2 \psi e_{yy}) + e_{zz}. \quad (18)$$

Taking the derivative of S with respect to angle ψ, gives $$\frac{dS}{dz} = \alpha[-\sin 2\psi (e_{xx} - e_{yy}) + 2\cos 2\psi\, e_{xy}]. \quad (19)$$

Using Eq. (2) to calculate components of the strain tensor, reduces Eq. (19) to $$\frac{dS}{dz} = -\alpha e_{\zeta\zeta}\sin^2\theta\sin[2(\phi - \psi)]. \quad (20)$$

The signal has extrema at the points where dS/dz=0, i.e. at

ψ=φ and ψ=φ±(π/2)

It is straightforward to check that the signal has a maximum at ψ=φ and a minimum at ψ=φ±(π/2). The correspondent values of the signal are equal to $$S_{max} = e_{\zeta\zeta}(\alpha \sin^2 \theta + \cos^2 \theta), \quad S_{min} = e_{\zeta\zeta} \cos^2 \theta. \quad (23)$$

From Eq. 23 it follows that $$\tan^2\theta = \frac{S_{max} - S_{min}}{\alpha S_{min}}.\qquad(24)$$

Solving Eq. 24 and substituting the result into Eq. 23 allows one to reconstruct $e_{\zeta\zeta}$.

EXAMPLE

A hypothetical cable has a radius for outer fibers with a 30-degree wrapping angle of 17.4 mm. A flat strip with a sinusoidal fiber described in the plane of the strip by:

$$y(x)=a\cdot\sin(bx)=\alpha\cdot\sin(\varphi)$$

with x=the inline distance along the strip. For a strip length of $x=2\pi/b$, the length of the fiber equals $$4\frac{\sqrt{1+(ab)^2}}{b}\int_0^{\frac{\pi}{2}}\sqrt{d\varphi\left(1-\frac{(ab)^2}{1+(ab)^2}\cdot\sin^2(\varphi)\right)} = 4\frac{\sqrt{1+(ab)^2}}{b}\cdot E\left(\sqrt{\frac{(ab)^2}{1+(ab)^2}}\right)$$

E is a complete elliptic integral of the second kind, which can be expressed as a power series.

Continuing the hypothetical, a channel is required every 2 m along the cable, while the channel length measured along the fiber is 8 m. Using a=0.0174 m, it can be calculated that 343.5 sinusoids need to be fitted into 2 m, corresponding to a wavelength $\lambda_1$=0.0183 m.

Figure 5:
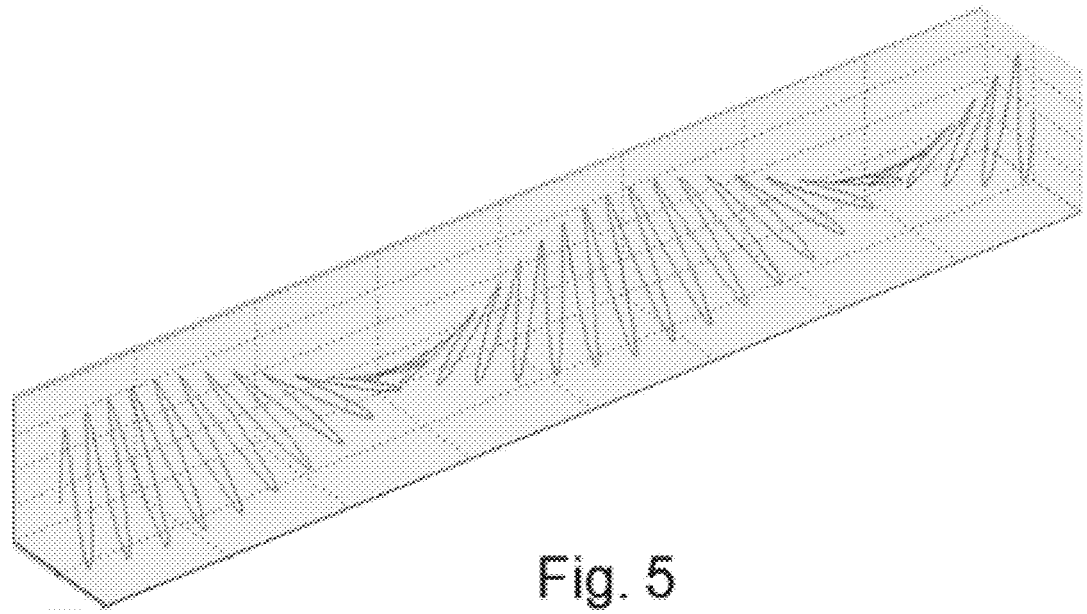
FIG. 5 is a schematic illustration of a twisted strip in accordance with an embodiment of the invention.

A flat strip is only sensitive in the x- and y-directions, but by twisting the strip it can be made sensitive to all 3 directions. FIG. 5 (not to scale) illustrates a twisted strip.

Assuming that the strip is twisted by $\pi$ radians over a distance $\lambda_2$=10 m, within each 10 m there will be 10 m/2 m=5 measurements, each with a different rotation along the cable axis, and each stepping on average by 180/5=36 degrees.

It may further be assumed that over the distance $\lambda_2$ the incident seismic wave is approximately a plane wave. For the highest frequencies in the groundroll this assumption may not be optimal, but otherwise it is reasonable.

As set out in detail above, by measuring the amplitudes over these 5 channels per 10 m and determining (e.g. by interpolation) the maximum and minimum amplitudes, it is possible to determine all 3 components of a wavefield using a single fiber. Reliability of the amplitudes measurements is essential in this process.

There is a risk that the fiber may bend instead of being compressed in the desired geometry, i.e. with an amplitude in the strip of 1.74 cm and a sinusoid length of 1.83 cm. Since at least 5 sample points per 10 m are required, (the maximum station spacing assuming plane waves), a maximum of 2 m are available for the channel spacing along the cable. If it were possible to shift the channels between time samples by a fraction of a m, it would be possible to use large channel spacings along the cable, resulting in longer sinusoid lengths and reduced risk of bending of the fiber.

In preferred embodiments, the cable described herein is used on the earth's surface for detecting/monitoring seismic signals travelling through the subsurface. Thus, it may be used in conjunction with a ground anchor such as is known in the art. Similarly, the cable may be used in one or more boreholes to for detecting/monitoring detect seismic signals travelling through the subsurface.

In addition to the various applications mentioned above, the cables described herein can be used as towed streamer cables or deployed on the seabed (OBC).

The embodiments described herein can be used advantageously alone or in combination with each other and/or with other fiber optic concepts. The methods and apparatus described herein can be used to measure arrival times and waveforms of acoustic signals and in particular broadside acoustic waves. Arrival times and waveforms give information about the formation and can be used in various seismic techniques.

In still other applications, the methods and apparatus described herein can be used to detect microseisms and the data collected using the present invention, including broadside wave signals, can be used in microseismic localization. In these embodiments, the data are used to generate coordinates of a microseism. In still other applications, ability of the present systems to detect broadside waves and axial waves distinguishably can be used in various DAS applications, including but not limited to intruder detection, monitoring of traffic, pipelines, or other environments, and monitoring of various conditions in a borehole, including fluid inflow.

While preferred embodiments have been disclosed and described, it will be understood that various modifications can be made thereto without departing from the scope of the invention as set out in the claims that follow.

What is claimed is:

1. A distributed fiber optic cable comprising:
   an elongate body comprising a prism having a plurality of longitudinal surfaces; and
   a plurality of optical fibers longitudinally housed in said elongate body, wherein each of said optical fibers lie in a different one of the plurality of longitudinal surfaces of the prism, and wherein each of the optical fibers has a sinusoidal shape along said different one of the plurality of longitudinal surfaces of the prism.

2. The distributed fiber optic cable of claim 1, wherein said prism is a triangular prism comprising three longitudinal surfaces.

3. The distributed fiber optic cable of claim 2, wherein said plurality of optical fibers comprises three optical fibers lying in said three longitudinal surfaces.

4. The distributed fiber optic cable of claim 3, wherein said three optical fibers have the same sinusoidal shape.

5. The distributed fiber optic cable of claim 2 further comprising a coordinate system (x, y, z) is chosen whereby a z-axis is directed longitudinally along the prism, and an x-axis and a y-axis lie in its cross-section, wherein one of the prism sides lies in an (x, z) plane, and two other sides lie in an (x', z) plane and an (x'', z) plane, and wherein an x'-axis of the (x', z) plane and an x''-axis of the (x'', z) plane of which are rotated with respect to the x-axis by angles $\psi$=60° and $\psi$−$\pi$=120°, respectively.

6. A method for optically sensing an acoustic wave using a fiber optic distributed acoustic sensing assembly, comprising steps of providing the distributed fiber optic cable of claim 1 and measuring backscattered light from a laser pulse input into the optical fibers in the distributed fiber optic cable of claim 1.

* * * * *